(12) United States Patent
Trionfetti

(10) Patent No.: US 12,392,597 B2
(45) Date of Patent: Aug. 19, 2025

(54) MEASURING DEVICE

(71) Applicant: BALANCE SYSTEMS S.r.L., Milan (IT)

(72) Inventor: Gianni Trionfetti, Agrate Brianza (IT)

(73) Assignee: BALANCE SYSTEMS S.R.L., Milan (IT)

( * ) Notice: Subject to any disclaimer, the term of this patent is extended or adjusted under 35 U.S.C. 154(b) by 336 days.

(21) Appl. No.: 18/173,493

(22) Filed: Feb. 23, 2023

(65) Prior Publication Data

US 2023/0273005 A1  Aug. 31, 2023

(30) Foreign Application Priority Data

Feb. 25, 2022  (IT) .......................... 102022000003578

(51) Int. Cl.
*G01B 7/12* (2006.01)
*G01B 7/00* (2006.01)

(52) U.S. Cl.
CPC .............. *G01B 7/001* (2013.01); *G01B 7/12* (2013.01)

(58) Field of Classification Search
CPC ........... G01B 7/12; G01B 7/125; G01B 7/001
USPC ........................................ 33/551, 558, 561
See application file for complete search history.

(56) References Cited

U.S. PATENT DOCUMENTS

| 455,855 | A |  | 7/1891 | Eldredge |  |
|---|---|---|---|---|---|
| 4,291,466 | A | * | 9/1981 | Bell | G01D 5/2216 33/501.04 |
| 6,295,866 | B1 | * | 10/2001 | Yamamoto | G01B 7/34 33/561 |
| 6,874,243 | B2 | * | 4/2005 | Hama | G01B 5/28 33/551 |
| 7,228,640 | B2 | * | 6/2007 | Trionfetti | B24B 49/04 33/555.1 |

(Continued)

FOREIGN PATENT DOCUMENTS

| EP | 0947290 A2 | 10/1999 |
|---|---|---|
| EP | 1628113 A1 | 2/2006 |

(Continued)

OTHER PUBLICATIONS

Italian Search Report mailed Sep. 13, 2022 for IT200200003578 filed Feb. 25, 2022, 7 pages.

*Primary Examiner* — George B Bennett
(74) *Attorney, Agent, or Firm* — Vorys, Sater, Seymour and Pease LLP

(57) ABSTRACT

A measuring device including a support base, a movable arm, having an extension prevailing along a longitudinal direction and rotatable with respect to the support base along a rotation axis skewed with respect to the longitudinal direction, a probe constrained to the movable arm, apparatus for measuring oscillation of the movable arm, first magnet including at least one first magnetic element constrained to the movable arm, at least one second magnetic element constrained to the support base and not oscillating with the movable arm, the first magnetic element and the second magnetic element reciprocally movable along a movement trajectory having prevailing extension along the longitudinal direction, the first magnetic element and the second magnetic element exerting magnetic force on each other in at least one position along the movement trajectory.

16 Claims, 2 Drawing Sheets

(56) References Cited

U.S. PATENT DOCUMENTS

| | | | | |
|---|---|---|---|---|
| 8,225,519 | B2* | 7/2012 | Hon | G01B 5/20 |
| | | | | 33/559 |
| 8,474,147 | B2* | 7/2013 | Mizutani | G01B 5/28 |
| | | | | 324/207.13 |
| 8,635,783 | B2* | 1/2014 | McDonnell | G01B 5/008 |
| | | | | 33/502 |
| 9,074,865 | B2* | 7/2015 | Yamauchi | G01B 21/30 |
| 9,291,442 | B2* | 3/2016 | Hidaka | G01B 21/30 |
| 9,505,104 | B2* | 11/2016 | Trionfetti | F16F 15/366 |
| 10,257,379 | B2 | 4/2019 | Isobe et al. | |
| 11,454,487 | B2* | 9/2022 | Schwarzer | G01B 5/20 |
| 11,644,298 | B2* | 5/2023 | Hamner | G01B 7/012 |
| | | | | 33/503 |
| 2005/0235512 | A1 | 10/2005 | Mies | |

FOREIGN PATENT DOCUMENTS

| | | | |
|---|---|---|---|
| EP | 2642242 | A1 | 9/2013 |
| EP | 2645052 | A1 | 9/2013 |

* cited by examiner

MEASURING DEVICE

FIELD OF THE INVENTION

The present invention relates to a device for measuring, in particular, workpieces, such as shaft diameters, shoulders and similar.

BACKGROUND OF THE INVENTION

The measuring devices, particularly of workpieces, such as shaft diameters, shoulders and similar, are currently known.

Indeed, during the precision machining of a workpiece, such as the grinding of a shaft or a shoulder, simultaneous and continuous measurements of the workpiece are necessary to verify the goodness of machining.

These measurements must be very precise, with tolerances preferably in the micrometre range, and must allow for measurements of parts of different sizes. One type in use of said measuring devices comprises an oscillating arm and the measuring means of said oscillations. For example, such measuring devices are known and described in patent applications US-B-10257379 and US-B-455855. For the measurement of shafts or cavities or similar, the arms are arranged in pairs and opposite each other.

Each arm is then rotatable around a fulcrum or hinge, usually consisting of a cylinder comprising two mutually perpendicular slats, as described in the applicant's European patent EP-B-2645052.

Each arm is constrained, on one side, to a probe, usually consisting of a tip or ball made of a very hard material, which is designed to come into contact with the part to be measured. On the opposite side of the probe, the arm is connected to a displacement sensor, usually of the LVDT type, which measures its displacement or rotation around said fulcrum or hinge. By measuring said displacement, the displacement of the probes is known and thus the dimensions of the part being measured are known.

Functionally and/or structurally connected to the arm, and thus also to the probe, are means of regulating the return force of the arm from displacements caused by contact with the part being measured. Such means usually consist of elastic elements, such as springs and similar, and are also preferably of adjustable force. In fact, for greater precision and for workpieces being measured with a high degree of hardness, it is advisable for said force to be high, while for less hard workpieces it is more appropriate for said force to be lower.

Furthermore, the said arms are preferably available in a machining position, in which they measure the workpiece, and in a charging position, in which they are substantially distanced from the workpiece and allow loading or unloading of a measuring workpiece. For example, if two measuring arms measure the diameter of a workpiece, in the machining position they are with their probes in contact with the workpiece, while in the charging position they are further apart from each other so that it is possible to engage and disengage the shaft being machined. For the measurement of a cavity, the positions are reversed.

The applicant's European patent EP-B-2642242 also describes adjustment devices that include arms that at the same time include external shock sensors that can alter the setting of the adjustment device.

The European patent EP-B-1628113, also by the same applicant, describes arms interrupted by a separable link, which is able to separate two portions of the arm without breakage in the event of a collision and allow its easy restoration.

The known technique described includes some major drawbacks.

In particular, the measuring devices are very complex and difficult to adjust. In addition, the accuracy of adjustment devices can be partly compromised during their use. For example, if the transition between charging and machining positions is not carried out correctly, micro-displacements may develop that affect the accuracy of the measurement.

Furthermore, it is still difficult to have both an accurate measurement and a high arm excursion.

Yet another drawback is that it is time-consuming and complex to adjust measuring devices to measure different types of workings, such as cavities or convexities, the latter given for example by shafts or others.

The applicant's European patent EP-B-0947290 describes a measuring device which overcomes some of the aforementioned drawbacks by the presence of first magnetic means, at the end of the arms, which can adjust said machining or reloading positions by inverting the polarity of the permanent magnets involved, and second magnetic means, arranged along the arm and on a fixed casing close to said arm, which can adjust the force of the probe against the workpiece by adjusting the distance between said magnets. Although this latter measuring device is very advantageous, it is very complex and the adjustment of the first magnetic means is not easy.

SUMMARY OF THE INVENTION

In this situation, the technical task underlying the present invention is to devise a measuring device capable of substantially obviating at least some of the aforementioned drawbacks.

Within this technical task, it is an important aim of the invention to obtain an accurate measuring device.

Another important purpose of the invention is to realise a measuring device that is easy to use and whose incorrect use prevents it from leading to incorrect measurements.

Another important purpose of the invention is to realise a robust measuring device. Another important purpose of the invention is to realise a simple and inexpensive measuring device.

The specified technical task and purposes are achieved by a measuring device (1) comprising:
  support base (2)
  a movable arm (3), having an extension prevailing along a longitudinal direction (3a) and being rotatable with respect to said support base (2) along a rotation axis (3b) skewed with respect to said longitudinal direction (3a),
  a probe (4) constrainable to said movable arm (3),
  measuring means (5) of said oscillation of said movable arm (3),
  first magnetic means (6) comprising:
    at least one first magnetic element (60) constrained to said movable arm (3),
    at least a second magnetic element (61) constrained to said support base (2) and not oscillating together with said movable arm (3),
    said first magnetic element (60) and said second magnetic element (61) being mutually movable along a movement trajectory (60a),
  said measuring device 1 being characterised by:

said movement trajectory (60a) has a prevailing extension along said longitudinal direction (3a),
said first magnetic element (60) and said second magnetic element (61) exerting magnetic force on each other in at least one position along said movement trajectory (60a).

The specified technical task and purposes are achieved by a measuring device as claimed.

Preferred technical solutions are highlighted in the dependent claims.

BRIEF DESCRIPTION OF THE DRAWINGS

The features and advantages of the invention are clarified below by a detailed description of preferred embodiments of the invention, with reference to the accompanying drawings, in which the FIG. 1a shows a schematic sectional view of the measuring device in a first configuration;

the FIG. 1b shows a schematic sectional view of the measuring device in a second configuration; and the FIG. 2 is a detail of an element according to the invention.

DETAILED DESCRIPTION OF THE PREFERRED EMBODIMENTS

Figure 1A:
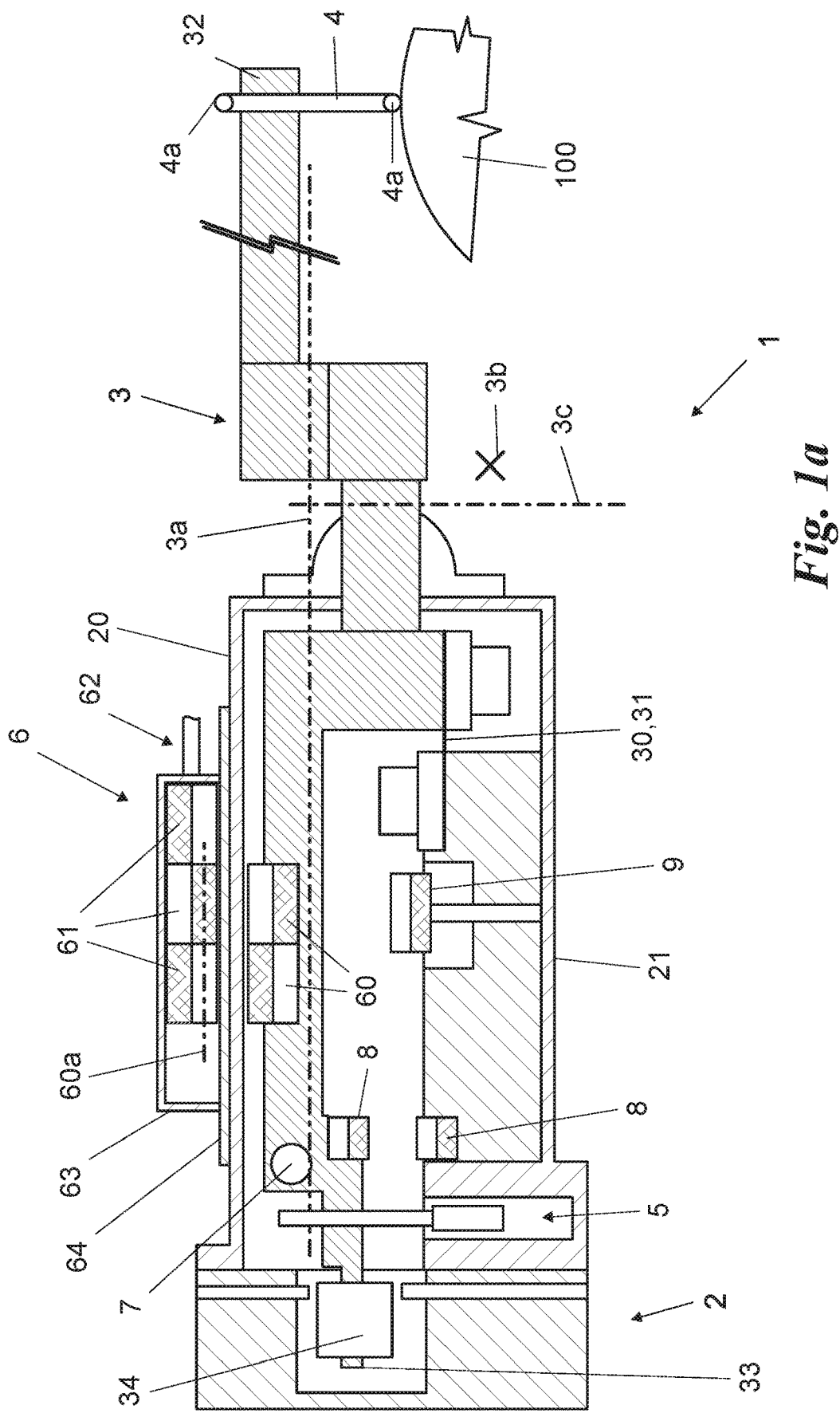
Figure 1B:
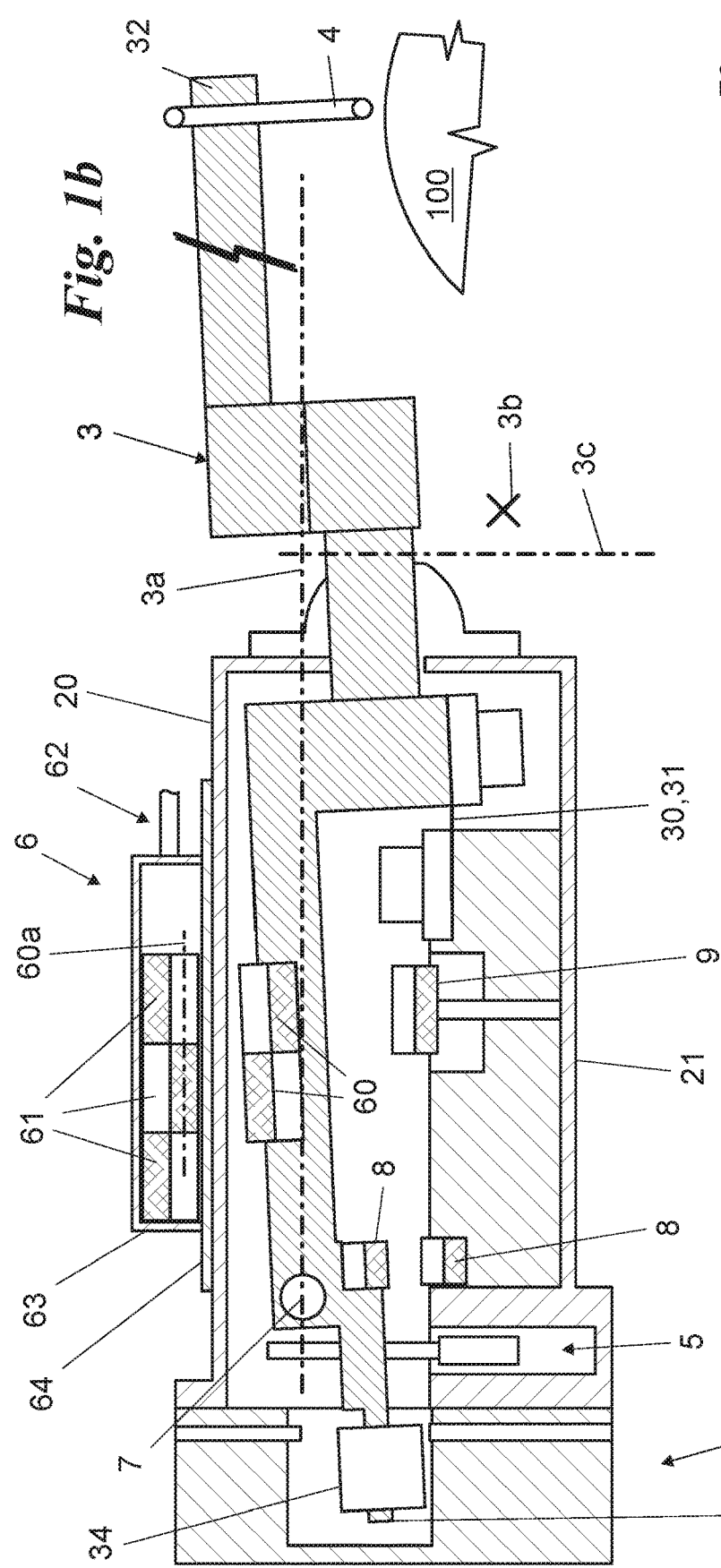
Figure 2:

In the present document, the measurements, values, shapes and geometric references (such as perpendicularity and parallelism), when associated with words like "about" or other similar terms such as "approximately" or "substantially", are to be considered as except for measurement errors or inaccuracies due to production and/or manufacturing errors, and, above all, except for a slight divergence from the value, measurements, shape, or geometric reference with which it is associated. For instance, these terms, if associated with a value, preferably indicate a divergence of not more than 10% of the value.

Moreover, when used, terms such as "first", "second", "higher", "lower", "main" and "secondary" do not necessarily identify an order, a priority of relationship or a relative position, but can simply be used to clearly distinguish between their different components.

Unless otherwise specified, as results in the following discussions, terms such as "treatment", "computing", "determination", "calculation", or similar, refer to the action and/or processes of a computer or similar electronic calculation device that manipulates and/or transforms data represented as physical, such as electronic quantities of registers of a computer system and/or memories in, other data similarly represented as physical quantities within computer systems, registers or other storage, transmission or information displaying devices.

The measurements and data reported in this text are to be considered, unless otherwise indicated, as performed in the International Standard Atmosphere ICAO (ISO 2533:1975).

With reference to the Figures, the measuring device according to the invention is globally referred to as 1.

It is capable of being positioned in correspondence of a piece in measurement 100, for example during a grinding or other precision machining operation. The said measurement preferably takes place during the machining itself.

The device 1 can measure, for example, the diameter of a shaft, the position of a shoulder, a cavity and more.

There may be several measuring devices 1 acting together, e.g. there may be two opposing and coplanar devices, as illustrated in patent application EP-B-0947290.

The measuring device 1 comprising, preferably, a support base 2, a movable arm 3, having a prevailing extension along a longitudinal direction 3a and being rotatable with respect to the support base 2 along a rotation axis 3b skewed, and preferably perpendicular, to the longitudinal direction 3a. A transverse direction 3c, perpendicular to the two preceding directions, completes the space.

The said support base 2 is basically all that is fixed in relation to the rotatable arm 3.

The latter is preferably substantially linear and oscillates around a hinge 30, which constrains the movable arm 3 to the support base 2. The said hinge 30 is preferably arranged substantially in the middle of the movable arm 3 with respect to the longitudinal direction 3a.

The movable arm 3 comprises a probe 4, which is constrained to said movable arm 3, preferably at or near a first end 32 of said movable arm 3. The touch probe 4 preferably comprises a rod element, preferably perpendicular to said longitudinal direction 3a and comprising a contact element 4a such as a tip made of hard material, spherical or similar. It may therefore also have a double contact element 4a protruding from both sides of said movable arm 3.

The movable arm 3 may further comprise a counterweight 34, for example at the opposite end from said first end 32.

The movable arm 3 is also, preferably, constrained to the support base 2 by means of a hinge 30 comprising a steel lamella 31, preferably made of harmonic steel, having a thickness of between 0.1 mm and 0.5 mm, more preferably between 0.2 mm and 0.4 mm and more preferably of about 0.3 mm, a width of between 1 mm and 2 cm, more preferably between 6 mm and 1.5 cm and more preferably of about 1 cm and a free portion, not integral with the movable arm 3 nor with said support base 2 having a length of between 0.5 mm and 3 mm, more preferably between 1 mm and 2 mm and more preferably of about 1.5 mm. In addition to the free portion, said slat is constrained solidly, and preferably removably, for example by means of screws and flanges, on one side to the support base 2 and on the other side to the movable arm 3. The said lamella 31 is oriented so that the prevailing plane of development is parallel to the longitudinal direction 3a and to the rotation axis 3b, defined by said lamella.

Finally, structurally, the movable arm 3 can be subdivided into two portions, of which the first portion is connected to said hinge 30 and comprises substantially all the elements with the exception of the probe 4. The portion comprising the probe 4 is preferably replaceable according to the parts to be measured, and the two portions can be reciprocally connected by various connections, such as those described in the European patent EP-B-1628113.

The measuring device 1 further preferably comprises measuring means 5 of the oscillation or displacement of the movable arm 3, so as to derive the displacement of the touch probe 4. Said measuring means 5 are preferably placed in the vicinity of a second end 33, opposite to said first end 32, or in any case preferably on the opposite side of said hinge 30 to said probe 4. They preferably comprise an LVDT-type sensor of a per se known type. Said sensor measures, preferably by means of electromagnetic fields, the displacement preferably in transverse direction 3c. The sensor means 5 are constrained partly to the movable arm 3 and partly to the support base 2.

Preferably, the described elements such as the sensor means, part of the arm 3 not including the probe 4, the measuring means 5, the hinge 30, and others described hereafter, are contained in a preferably non-magnetic, preferably liquid-tight casing 21, inside of which lubricating oil is arranged. The casing 21 is integral with the support base 2. Preferably only a part of the movable arm 3, including the probe 4 and the connection between the two portions of the arm itself, protrudes out of the casing.

Between the arm 3 and the casing 2 is preferably present, in order to allow both the watertight and the handling of arm 3, a flexible sealing gasket, for example elastomeric and more preferably there are two overlapping seals, for the purpose to guarantee a better sealing. These gaskets are known for them.

The measuring device 1 further preferably comprises first magnetic means 6. They comprise at least a first magnetic element 60 constrained to the movable arm 3, and at least a second magnetic element 61 constrained to the support base 2 and not oscillating together with the movable arm 3.

The first magnetic element 60 and the second magnetic element 61 are mutually movable along a preferably rectilinear movement trajectory 60a. Said movement trajectory 60a preferably has prevalent extension along the longitudinal direction 3a and the first magnetic element 60 and the second magnetic element 61 preferably exert a substantial mutual magnetic force in at least one position along the movement trajectory 60a.

Preferably, the first magnetic element 60 and the second magnetic element 61 are permanent magnets, for example neodymium magnets. They are placed with the polarities preferably split substantially along the plane parallel to the longitudinal axis 3a and the rotation axis 3b. Alternatively, they may be ferromagnetic elements or electromagnets.

More preferably, the first magnetic element 60 comprises a plurality of side-by-side permanent magnets, more preferably two side-by-side permanent magnets. Said side-by-side magnets are preferably placed with alternating polarities relative to each other and always with polarities preferably divided substantially along the plane parallel to the longitudinal axis 3a and the rotation axis 3b. For example, cylindrical magnets with the cylinder axis substantially parallel to the transverse axis 3c. Finally, the first magnetic element 60 is preferably fixed with respect to and integral with the movable arm 3.

The second magnetic element 61 also preferably comprises a plurality of side-by-side permanent magnets, more preferably three side-by-side permanent magnets, or even two. Said side-by-side magnets are preferably placed with alternating polarities with respect to each other and always with polarities preferably divided substantially along the plane parallel to the longitudinal axis 3a and the rotation axis 3b. For example, cylindrical magnets having a cylinder axis substantially parallel to the transverse axis 3c.

The first magnetic means 6 therefore predominantly exert force in the transverse direction 3c.

The second magnetic element 61 is preferably constrained in a compliant way to a support portion 20, integral with said support base 2, and having prevalent extension along the longitudinal direction 3a. The support portion 20 is preferably a portion of the casing 21.

In addition, preferably, the second magnetic element 61 is sliding along the support portion 20.

In particular, the measuring device 1 comprising movement means 62 of the second magnetic means 61 capable of allowing rapid movement of the same second magnetic element 61 along the movement trajectory 60a, so as to substantially reverse the attraction/repulsion force between said first and second magnetic elements 60, 61 to move from a charging position to a processing position or vice versa.

The handling means 62 are preferably of the pneumatic type. Essentially, a small casing 63 includes a sealed chamber within which the second magnetic element 61 can slide with a compressed air inlet and outlet at one end. Pressurisation or depressurisation of said chamber allows movement of the second magnetic element 61 in one direction or the opposite direction along said movement trajectory 60a. Alternatively, the handling means 62 may be electrical or other.

The measuring device 1 also preferably comprising positioning means 64 of the second magnetic element 61 with respect to the support portion 20 suitable for varying the reciprocal position of the first and second magnetic elements 60, 61 along the movement trajectory 60a so as to vary the attraction/repulsion force between said first and second magnetic elements 60, 61. The positioning means 64 may comprise several seats along the support portion 20, or an adjustable slide by means of, for example, a worm screw or other means. In another example, the positioning means 64 comprise end screws located in the previously described casing 63.

The measuring device 1 may further comprise second magnetic means 7 comprising at least a third magnetic element 70 constrained to the movable arm 3, at least a fourth magnetic element 71 constrained to the support base 2 and not oscillating together with the movable arm 3. The second magnetic elements 7 act predominantly in a direction perpendicular to the direction of action of said first magnetic means 6 and to said longitudinal direction 3a. They are suitable for balancing the position of the movable arm 3 in a direction perpendicular to the direction of action of said first magnetic means 6 and of said longitudinal direction 3a. Said second magnetic means 7 may also allow measurement along a second axis, perpendicular to the first one, if further measuring means are present.

The measuring device 1 may further comprise further magnetic means suitable for adjusting the opening force closing said movable arm 3 in certain positions. In particular, third magnetic means 8, suitable for linearising the opening force along the last stroke and comprising two opposing magnets which attract each other. There may also be fourth magnetic means 9, for levelling the force over the entire measuring range.

The operation of measuring device 1 described above in structural terms is as follows.

The movable arm 3 is used in a familiar way.

During machining, the first and second magnetic elements 60 and 61 attract or repel each other. The force of attraction or repulsion determines the pressure of the touch probe 4 on the workpiece. This force can be adjusted by means of the positioning means 64. In particular, if the opposite polarities are perfectly opposed or aligned, the force of attraction or repulsion will be maximum, otherwise a greater displacement will cause a proportional decrease in the force of attraction or repulsion and thus in the pressure of the probe 4 on the workpiece.

In the event that the movable arm(s) 3 must be moved to change to the replacement configuration, it is sufficient to activate the movement means 62, which preferably cause a displacement of the magnets equal to the diameter of one polarity of the magnets and reverse the attraction-repulsion action, causing an immediate approach-removal of the movable arms 3.

Measurements in other directions are also possible, thanks to the second magnetic means 7, and further adjustments are possible thanks to the third and fourth magnetic means.

The measuring device 1 according to the invention achieves important advantages. In fact, it is very precise and easy to use.

The movement of the moving arms 3 is realised through magnetic media and the workpiece is not disturbed as a result, which always returns to known and precise positions. In addition, the movements by compressed air take place outside the sealed casing 21. There is therefore no risk, in the event of compressed air leaks, of deterioration of elements inside the measuring head and repairs are easier. The measuring device 1 is also robust, as it can only be moved by means of magnets and the same device performs both the necessary movement from the working position to the reloading position and the adjustment of the pressure force of the probe 4.

Finally, the measuring device is simple and inexpensive, as it consists of only a few parts.

Furthermore, all the elements outside the casing, and in particular the second magnetic element 61, the handling means 62, the positioning means 64, can be added individually or as a group to the measuring device 1, even after its purchase. It is therefore very flexible and operationally modifiable.

Finally, it allows measurements in both directions of oscillation of the arms 3, as the first magnetic means 6 can be oriented in the preferred direction.

The invention is susceptible to variations within the scope of the inventive concept as defined by the claims. Within that scope, all details are substitutable by equivalent elements and the materials, shapes and dimensions can be any.

The invention claimed is:

1. A measuring device comprising:
   support base,
   a movable arm, having an extension prevailing along a longitudinal direction and being rotatable with respect to said support base along a rotation axis skewed with respect to said longitudinal direction,
   a probe constrainable to said movable arm,
   measuring means of said oscillation of said movable arm,
   first magnetic means comprising:
   at least one first magnetic element constrained to said movable arm,
   at least a second magnetic element constrained to said support base and not oscillating together with said movable arm,
   said first magnetic element and said second magnetic element being mutually movable along a movement trajectory,
   wherein said movement trajectory has a prevailing extension along said longitudinal direction,
   wherein said first magnetic element and said second magnetic element exerting magnetic force on each other in at least one position along said movement trajectory.

2. The measuring device according to claim 1, wherein said first magnetic element and said second magnetic element are permanent magnets.

3. The measuring device according to claim 1, wherein:
   said second magnetic element is constrained in a compliant way to a support portion, integral with said support base, and having a prevailing extension along said longitudinal direction,
   said movement trajectory is rectilinear,
   wherein said second magnetic element slides along said portion of support and said first magnetic element is fixed with respect to said movable arm.

4. The measuring device according to claim 3, comprising movement means of said second magnetic element so as to allow rapid movement of said second magnetic element so as to substantially reverse the force of attraction/repulsion between said first and second magnetic elements for passing from a charging position to a processing position or vice versa.

5. The measuring device according to claim 4, wherein said movement means are of pneumatic type.

6. The measuring device according to claim 4, comprising means for positioning said second magnetic element with respect to said support portion suitable for allowing the variation of the reciprocal position of said first and second magnetic elements along said movement trajectory so as to vary the force of attraction/repulsion between said first and second magnetic elements.

7. The measuring device according claim 1, comprising a casing and wherein:
   said support base, said movable arm, said measuring means, said first magnetic element are contained in said casing,
   said second magnetic element is external to said casing.

8. The measuring device according to claim 1, comprising second magnetic means comprising:
   at least a third magnetic element constrained to said movable arm,
   at least a fourth magnetic element constrained to said support base and not oscillating together with said movable arm,
   said second magnetic elements acting predominantly in a direction perpendicular to the direction of action of said first magnetic means and to said longitudinal direction.

9. The measuring device according claim 1, comprising further magnetic means for linearising the opening-closing force of said movable arm in certain positions.

10. The measuring device according to claim 1, wherein said movable arm is constrained to said support base by means of a steel lamella, having a thickness between 0.1 mm and 0.5 mm, a width between 1 mm and 2 cm and a free portion, not integral with said movable arm nor with said support base having a length between 0.5 mm and 3 mm.

11. The measuring device according to claim 1, wherein said probe is rod-shaped and comprises contact elements on both ends.

12. The measuring device according to claim 5, comprising means for positioning said second magnetic element with respect to said support portion suitable for allowing the variation of the reciprocal position of said first and second magnetic elements along said movement trajectory so as to vary the force of attraction/repulsion between said first and second magnetic elements.

13. The measuring device according to claim 6, comprising means for positioning said second magnetic element with respect to said support portion suitable for allowing the variation of the reciprocal position of said first and second magnetic elements along said movement trajectory so as to vary the force of attraction/repulsion between said first and second magnetic elements.

14. The measuring device according to claim 2, wherein:
   said second magnetic element is constrained in a compliant way to a support portion, integral with said support base, and having a prevailing extension along said longitudinal direction,
   said movement trajectory is rectilinear,
   wherein said second magnetic element slides along said portion of support and said first magnetic element is fixed with respect to said movable arm.

15. The measuring device according to claim 14, comprising movement means of said second magnetic element so as to allow rapid movement of said second magnetic element so as to substantially reverse the force of attraction/ repulsion between said first and second magnetic elements for passing from a charging position to a processing position or vice versa.

16. The measuring device according to claim 15, wherein said movement means are of pneumatic type.

* * * * *